Feb. 27, 1945.   A. BRUNNER   2,370,141

BRAKE TESTING APPARATUS

Filed Sept. 26, 1941

INVENTOR
A. BRUNNER
BY
*J. F. Huffman*
ATTORNEY

Patented Feb. 27, 1945

2,370,141

UNITED STATES PATENT OFFICE 2,370,141

BRAKE TESTING APPARATUS

Albert Brunner, Jennings, Mo., assignor to Wagner Electric Corporation, St. Louis, Mo., a corporation of Delaware Application September 26, 1941, Serial No. 412,371

4 Claims. (Cl. 161—15)

My invention relates to brake testing apparatus and more particularly to an apparatus which can be attached to a vehicle to test the brakes thereof under operating conditions when the vehicle is on a highway.

One of the objects of my invention is to produce a brake testing apparatus which can be quickly attached to a vehicle to thereby obtain data during braking from which the condition of the brakes can be ascertained.

Another object of my invention is to provide a brake testing apparatus for attachment to a vehicle whereby the period of time which elapsed between the beginning of the braking period and the stopping of the vehicle can be accurately obtained.

Still another and more general object of my invention is to produce a brake testing apparatus which is portable, which can be quickly attached to a vehicle for testing purposes, and which is efficient in operation.

Figure 1:
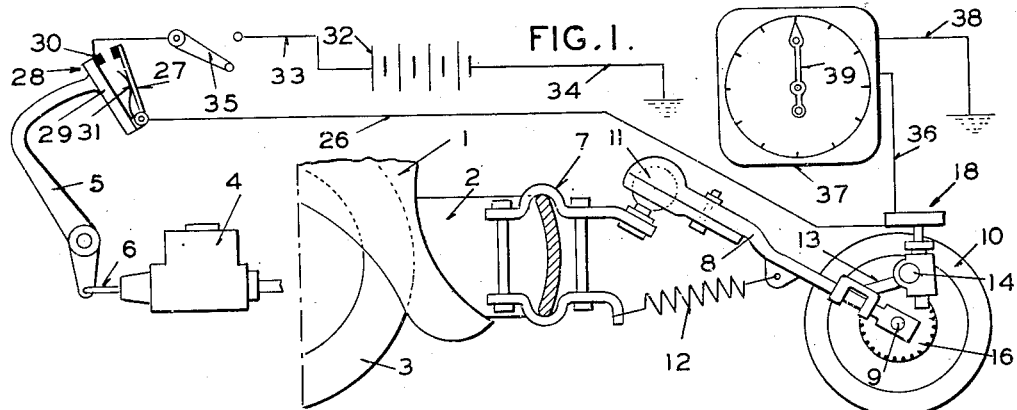
Figure 2:
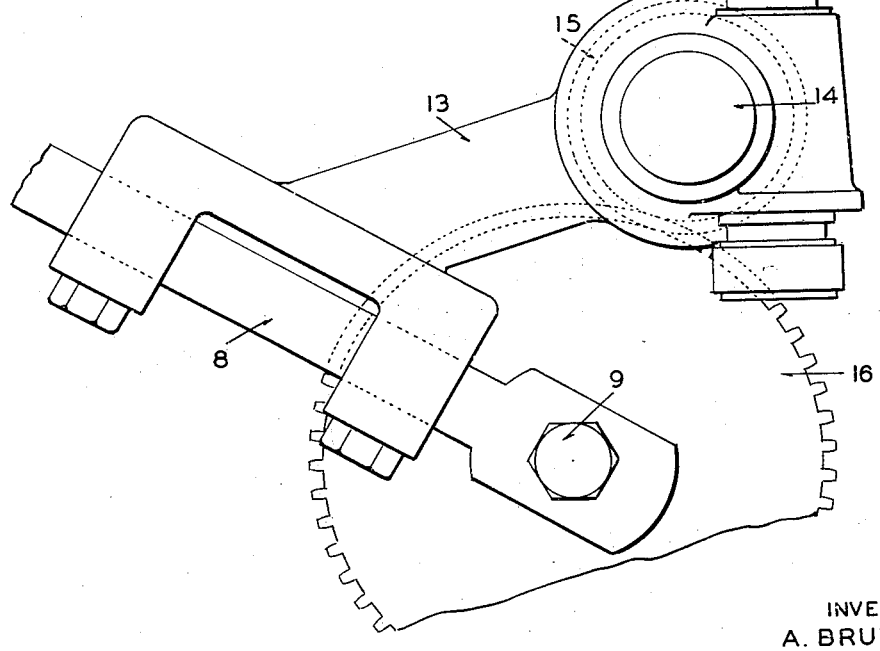

Other objects of my invention will become apparent from the following description taken in connection with the accompanying drawing in which Figure 1 is a schematic view of the brake testing apparatus showing the manner in which it is attached to a vehicle; and Figure 2 is an enlarged view of the wheel-operated switch, parts being shown in section.

Referring to the figures in detail, the numeral 1 indicates the rear portion of an automobile which carries a bumper 2. The wheels 3 (one only being shown) of the automobile are provided with the usual brakes which may be either mechanically or hydraulically actuated. In the schematic arrangement shown, the brakes are hydraulically actuated and the system includes a master cylinder 4, a pressure producing piston (not shown) which is actuated by a brake pedal 5 and a connecting piston rod 6.

Adapted to be attached to the bumper 2 by means of a suitable clamp 7 is a fork 8 connected to hub 9 of a single trailing wheel 10. In order that wheel 10 may be free to properly follow the automobile under all conditions, the fork is connected to the clamp by a ball and socket 11 which permits the wheel to move laterally and also vertically with respect to the bumper. There is also provided a spring 12 for holding wheel 10 in constant engagement with the road surface.

Secured to one leg of the fork 8 adjacent hub 9 of the wheel, is a bracket 13 in which is journaled a shaft 14. This shaft carries a gear 15 which is constantly in mesh with a gear 16 secured to hub 9 of the wheel. The bracket 13 also has journaled therein a shaft 17 positioned at right angles to shaft 14 and said shaft 17 is adapted to be driven from shaft 14 by suitable gearing (not shown) in a well-known manner. The upper end of shaft 17 extends into a casing 18 mounted on bracket 13, said casing comprising two metal parts 19 and 20 which are electrically insulated from each other by suitable insulating material 21. Within the casing and secured to shaft 17 is a disc 22 having a depression or recess 23 in which is positioned a metal ball 24. Above disc 23 and formed in the casing part 19 is an annular ridge 25 adapted to be contacted by ball 24 when it is thrown out of the depression 23 as a result of the action of centrifugal force caused by the rotation of disc 23.

The casing part 20 has connected thereto an electrical conductor 26 which leads to a contact element 27 of a switch 28 mounted on the pedal pad 29 of brake pedal 5. The contact element 27 is pivoted to the pedal pad and cooperates with the other switch element 30 fixed on the pedal pad. The switch is normally held open by a spring 31. The switch element 30 is connected with one terminal of a battery 32 by means of a conductor 33, the other terminal of said battery being connected to ground by a conductor 34. If desired, a manually-operated switch 35, such for example, as the ignition switch of the automobile, may be inserted in conductor 33.

The casing part 19 has connected thereto an electrical conductor 36 which leads to one terminal of a control magnet (not shown) of a magnetically-controlled time indicating instrument 37. The other terminal of the control magnet is connected to ground by a conductor 38. The time indicating instrument is of known construction and is not shown in detail, it being of the type in which the indicating hand 39 begins to move to indicate elapsed time whenever the magnet is energized, and stops whenever the magnet is de-energized.

In operation of the brake testing apparatus the manual switch 35 will be closed. Whenever the vehicle is moving, the disc 23 will be rotated by trailing wheel 10 and as a result thereof, the ball 24 will be thrown outwardly into engagement with ridge 25, thus electrically connecting conductors 26 and 36. When the vehicle is moving and it is desired to make a brake test, the brakes will be applied by operating the brake pedal by the foot of the operator. To operate the brake, it is necessary to place the foot of the operator on the movable switch element 27. Thus it is seen that switch 28 will be closed simultaneously with the brakes being initially applied. The closing of the switch will close the electrical circuit and start the time indicating instrument since the control magnet thereof will be energized. This magnet will continue to be energized as long as switch 28 is held closed and the vehicle continues to move. When the vehicle is brought to a stop by the brakes, trailer wheel 10 will cease rotating and consequently disc 27, which is driven thereby, will also cease rotating. Since centrifugal force will now no longer act on ball 24, it will fall back into the depression or recess 23 out of contact with ridge 25, thus breaking the circuit. When the circuit is broken, the magnet of the time indicating instrument will be de-energized, thus causing the hand of the instrument to stop. The time which has elapsed between initial application of the brakes and the stopping of the vehicle will now be indicated by the hand of the indicating instrument.

The elapsed time for stopping the vehicle when braked, bears a direct relation to the distance the vehicle travels from the time the brakes are initially applied to the time the vehicle stops. If the vehicle should be traveling, say, for example, thirty miles per hour, and the brakes are applied, the time to stop the vehicle by the brakes will be indicated by the instrument. If this time is equal to or less than the time necessary to bring the vehicle to a stop in a given number of feet and traveling at a given rate of speed, then it is known that the brakes are in proper condition. If the time is greater than the time necessary to stop the vehicle at a given distance and at a given speed, then it is known that the brakes are not in proper condition. If the speed of the vehicle is known when the brakes are applied and also the time elapsed in bringing the vehicle to a stop after the brakes are initially applied, then all the necessary information is available for knowing whether the brakes are in proper condition. If the law requires that the brakes be capable of stopping a vehicle in a certain specified distance when traveling at a given speed, this distance has its corresponding elapsed time period (the corresponding stopping times and distances for given speeds can be charted, if desired, so as to be readily available). Since the indicating instrument of the brake testing device described indicates the elapsed time, it is very easy to ascertain whether the brakes are capable of stopping the vehicle as required by law.

It is noted that the testing apparatus described is portable and capable of being readily attached to and detached from a vehicle. The indicating instrument can be placed at any desired place for easy reading. Although a pedal pad switch is shown, other types of switch can be employed such, for example, as a fluid pressure-operated switch connected to the brake lines and capable of closing simultaneously with development of pressure to apply the brakes. The indicating instrument will be provided with a reset mechanism in order that it may be set back to zero after a test is made.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In brake testing apparatus for use with a vehicle provided with brakes and means for applying the brakes, said apparatus comprising a time indicating instrument, means for rendering the indicating instrument operative when the vehicle is moving and the brakes are applied, and means operable without release of the brakes for rendering the indicating instrument inoperative at substantially the instant when the vehicle comes to a stop to thereby obtain such accurate timing of the braking period during stopping that the efficiency of the brakes can be ascertained.

2. In brake testing apparatus for use with a vehicle provided with brakes and means for applying the brakes, said apparatus comprising a time indicating instrument, electrical control means for said indicating instrument including an electrical circuit, and means for rendering the indicating instrument operative by the electrical control means when the vehicle is moving and the brakes are applied and inoperative by the breaking of the circuit at substantially the instant when the vehicle comes to a stop to thereby obtain such accurate timing of the braking period during stopping that the efficiency of the brakes can be ascertained.

3. In brake testing apparatus for use with a vehicle provided with brakes and means for applying the brakes, said apparatus comprising an electrically-controlled time indicating instrument, an electrical circuit for said instrument, two switches in said circuit, means for closing one of said switches only when the brakes are applied, means controlled by a member which moves only when the vehicle is moving for maintaining the other switch closed, said last named means comprising a movable member subject to the action of gravity and centrifugal force and being placed in switch closed position by centrifugal force resulting from the moving of the vehicle and in switch open position by gravity substantially the instant the vehicle stops and means operable at will for enabling the attaching to and detaching from the vehicle of said member and other switch.

4. In brake testing apparatus for use with a vehicle provided with brakes and means for applying the brakes, said apparatus comprising an electrically-controlled time indicating instrument, an electrical circuit for said instrument, a switch in said circuit, means for closing said switch when the brakes are applied, a road engaging wheel separate from the vehicle wheels, means for detachably connecting said wheel to the vehicle, a second switch in said circuit and comprising a movable member held in normal open position by the action of gravity but capable of assuming a closed position under the action of centrifugal force, and means operable by said separate wheel when turning for causing centrifugal force to act on said movable member and close said second switch, said movable member assuming its switch open position by the action of gravity substantially simultaneously with the stopping of the turning of the wheel.

A. BRUNNER.